United States Patent
Stacy et al.

(10) Patent No.: US 9,116,569 B2
(45) Date of Patent: Aug. 25, 2015

(54) TOUCH-SENSITIVE DISPLAY METHOD AND APPARATUS

(75) Inventors: William Stacy, Redwood City, CA (US); Robert J. Lowles, Waterloo (CA)

(73) Assignee: BlackBerry Limited, Waterloo (CA)

( * ) Notice: Subject to any disclaimer, the term of this patent is extended or adjusted under 35 U.S.C. 154(b) by 873 days.

(21) Appl. No.: 12/625,381

(22) Filed: Nov. 24, 2009

(65) Prior Publication Data

US 2010/0128002 A1 May 27, 2010

Related U.S. Application Data

(60) Provisional application No. 61/118,406, filed on Nov. 26, 2008.

(51) Int. Cl.
| | |
|---|---|
| *G06F 3/044* | (2006.01) |
| *G06F 3/041* | (2006.01) |
| *G06F 3/01* | (2006.01) |

(52) U.S. Cl.
CPC .............. *G06F 3/0414* (2013.01); *G06F 3/016* (2013.01); *G06F 3/044* (2013.01)

(58) Field of Classification Search
USPC .......................................................... 345/173
See application file for complete search history.

(56) References Cited

U.S. PATENT DOCUMENTS

| | | | | |
|---|---|---|---|---|
| 4,731,694 | A | * | 3/1988 | Grabner et al. ................ 361/280 |
| 5,038,142 | A | | 8/1991 | Flower et al. |
| 5,159,159 | A | * | 10/1992 | Asher ......................... 178/18.05 |
| 5,231,381 | A | | 7/1993 | Duwaer |
| 5,463,388 | A | | 10/1995 | Boie et al. |
| 5,510,813 | A | * | 4/1996 | Makinwa et al. .............. 345/173 |
| 5,675,329 | A | * | 10/1997 | Barker et al. .................... 341/22 |
| 5,708,460 | A | | 1/1998 | Young et al. |
| 6,492,979 | B1 | | 12/2002 | Kent et al. |
| 6,504,530 | B1 | | 1/2003 | Wilson et al. |
| 7,148,882 | B2 | | 12/2006 | Kamrath et al. |
| 7,154,481 | B2 | * | 12/2006 | Cross et al. .................... 345/173 |
| 7,196,694 | B2 | | 3/2007 | Roberts |
| 7,511,702 | B2 | * | 3/2009 | Hotelling ....................... 345/173 |
| 7,538,760 | B2 | | 5/2009 | Hotelling et al. |
| 2003/0179190 | A1 | | 9/2003 | Franzen |
| 2006/0022952 | A1 | | 2/2006 | Ryynanen et al. |
| 2006/0066590 | A1 | * | 3/2006 | Ozawa et al. ................. 345/173 |
| 2006/0119586 | A1 | | 6/2006 | Grant |

(Continued)

FOREIGN PATENT DOCUMENTS

| | | |
|---|---|---|
| WO | 2008012491 A1 | 1/2008 |
| WO | 2008125130 A1 | 10/2008 |

OTHER PUBLICATIONS

International Search Report, PCT Application No. PCT/US2009/065741, dated Feb. 24, 2010, 3 pages.

(Continued)

*Primary Examiner* — Linh N Hoffner

(74) *Attorney, Agent, or Firm* — Steven M. Greenberg, Esq.; Gary Monka, Esq.; CRGO Law

(57) ABSTRACT

A portable electronic device comprises at least one force sensor configured to generate a force signal based at least in part on a force applied to a touch-sensitive display and a processor configured to receive the force signal and to provide a feedback signal when the force exceeds a force threshold. The at least one force sensor may be integrated into the touch-sensitive display.

23 Claims, 7 Drawing Sheets

(56) References Cited

U.S. PATENT DOCUMENTS

| | | | |
|---|---|---|---|
| 2006/0139340 A1* | 6/2006 | Geaghan | 345/177 |
| 2006/0244733 A1* | 11/2006 | Geaghan | 345/173 |
| 2007/0103449 A1* | 5/2007 | Laitinen et al. | 345/173 |
| 2008/0088600 A1* | 4/2008 | Prest et al. | 345/173 |
| 2008/0100590 A1* | 5/2008 | Hur et al. | 345/173 |
| 2008/0122315 A1* | 5/2008 | Maruyama et al. | 310/314 |
| 2009/0184921 A1* | 7/2009 | Scott et al. | 345/156 |
| 2010/0052880 A1* | 3/2010 | Laitinen et al. | 340/407.2 |
| 2010/0156814 A1* | 6/2010 | Weber et al. | 345/173 |
| 2010/0156818 A1* | 6/2010 | Burrough et al. | 345/173 |
| 2010/0156823 A1* | 6/2010 | Paleczny et al. | 345/173 |
| 2010/0171711 A1* | 7/2010 | Mak-Fan et al. | 345/173 |

OTHER PUBLICATIONS

International Written Opinion, PCT Application No. PCT/US2009/065741, dated Feb. 24, 2010, 5 pages.

* cited by examiner

TOUCH-SENSITIVE DISPLAY METHOD AND APPARATUS

CROSS-REFERENCE TO RELATED APPLICATIONS

This patent application claims the benefit of U.S. Provisional Patent Application Ser. No. 61/118,406 filed on Nov. 26, 2008, the entire contents of which are incorporated herein by reference.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities. These devices run on a wide variety of networks from data-only networks such as Mobitex® and DataTAC® networks to complex voice and data networks such as GSM/GPRS, CDMA, EDGE, UMTS and CDMA2000 networks.

Portable electronic devices such as PDAs or smart telephones are generally intended for handheld use and ease of portability. Smaller devices are generally desirable for portability. A touch screen display for input and output is useful on such handheld devices, as such handheld devices are small and are limited in space available for user input and output. Further, the screen content on touchscreen displays may be modified depending on the functions and operations being performed. These devices have a limited area for rendering content on the touch screen display and for rendering features or icons, for example, for user interaction. With continued demand for decreased size of portable electronic devices, touch screen displays continue to decrease in size.

Improvements in touch screen devices are therefore desirable.

DETAILED DESCRIPTION

Figure 1:
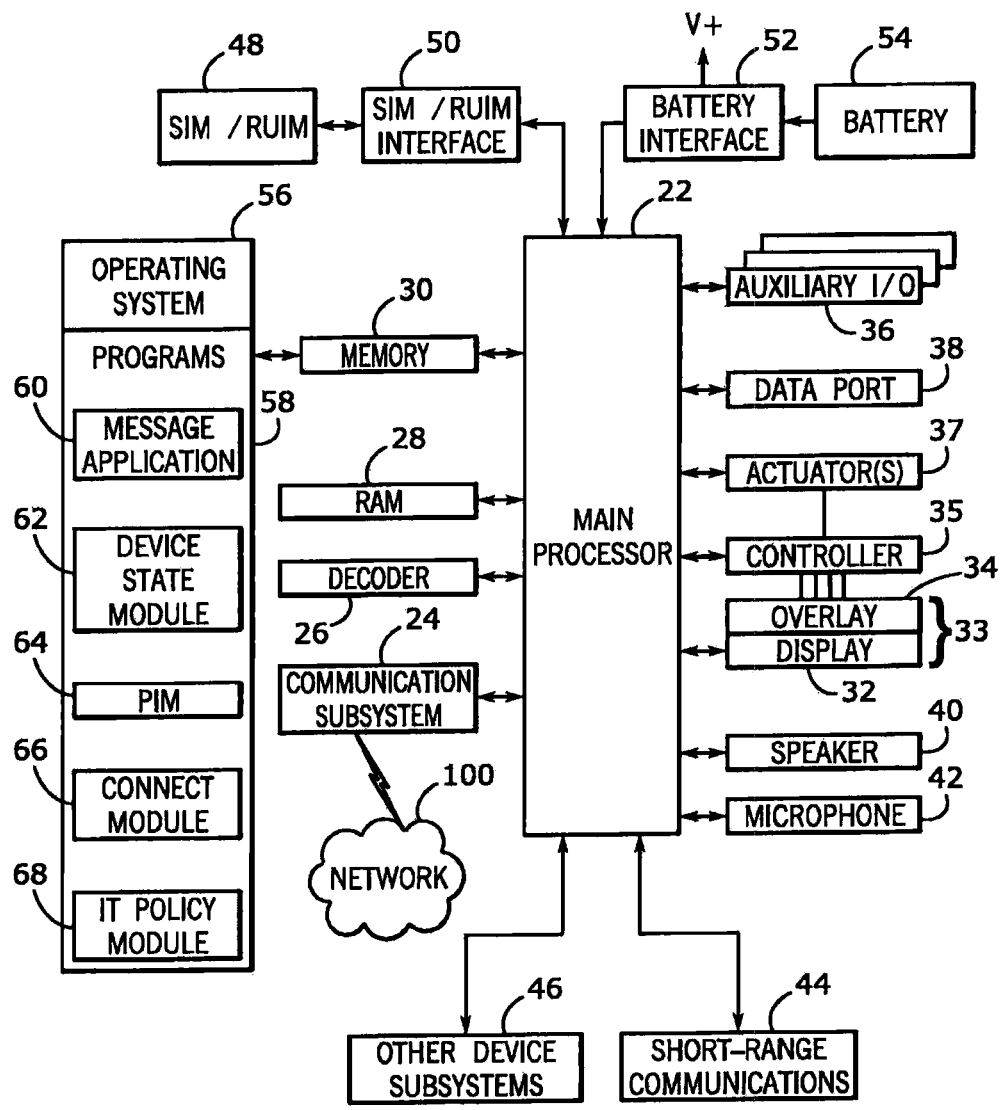
FIG. 1 is a block diagram of a portable electronic device in accordance with the disclosure.

A portable electronic device comprises at least one force sensor configured to generate a force signal based at least in part on a force applied to a touch-sensitive display and a processor configured to receive the force signal and to provide a feedback signal when the force exceeds a force threshold. The at least one force sensor may be integrated into the touch-sensitive display. The at least one force sensor may be distributed within a layer of the touch-sensitive display. The touch-sensitive display may comprise a plurality of layers comprising a touch sensor and the at least one force sensor. A layer of the touch-sensitive display may comprise a touch sensor and at least one force sensor. The portable electronic device may comprise an actuator configured to provide tactile feedback in response to the feedback signal. The actuator may provide tactile feedback by moving the touch-sensitive display relative to a housing of the portable electronic device. The processor may be configured to utilize at least a location of a detected touch and the force signal to determine whether to provide the feedback signal. The controller may be configured to evaluate a time duration of the touch to determine, at least in part, whether to provide the feedback signal. The touch-sensitive display may be configured to provide a visual indicator associated with a location of the force when the force is below the force threshold.

A method comprises detecting a touch at a location on a touch-sensitive display, determining a force of the touch, and when the force exceeds a force threshold, providing tactile feedback and performing a function associated with the location. When the force is below the force threshold, no tactile feedback may be provided. When the force is below the force threshold, a visual indicator associated with the location may be provided. The method may further comprise evaluating the force of the touch and the location of the touch to determine whether to send a feedback signal to an actuator to provide the tactile feedback. When the location of the touch is not associated with a function, no tactile feedback may be provided when the force of the touch exceeds the force threshold. The method may further comprise determining a time duration of the touch and evaluating the time duration, at least in part, to determine whether to provide the tactile feedback. A computer readable medium may have computer-readable code executed by at least one processor of a portable electronic device to perform the methods described above.

A touch-sensitive display comprises at least one touch sensor and at least one force sensor integrated into the touch-sensitive display and is configured to determine a location of a touch on the touch-sensitive display. The touch sensor and the at least one force sensor may be formed during the same process. The touch sensor and the at least one force sensor may be formed of the same material.

For simplicity and clarity of illustration, reference numerals may be repeated among the figures to indicate corresponding or analogous elements. In addition, numerous specific details are set forth in order to provide a thorough understanding of the embodiments described herein. The embodiments described herein may be practiced without these specific details. In other instances, well-known methods, procedures and components have not been described in detail so as not to obscure the embodiments described herein. Also, the description is not to be considered as limited to the scope of the embodiments described herein.

The disclosure generally relates to an electronic device, which may be, for example, a portable electronic device. Examples of portable electronic devices include mobile, or handheld, wireless communication devices such as pagers, cellular phones, cellular smart-phones, wireless organizers, personal digital assistants, wirelessly enabled notebook computers, and so forth. The portable electronic device may also be a portable electronic device without wireless communication capabilities such as a handheld electronic game device, digital photograph album, digital camera, or other device.

A block diagram of an exemplary embodiment of a portable electronic device 20 is shown in FIG. 1. The portable electronic device 20 includes a number of components such as a processor 22 that controls the overall operation of the portable electronic device 20. Communication functions, including data and voice communications, are performed through a communication subsystem 24. Data received by the portable electronic device 20 may be decompressed and decrypted by a decoder 26, operating according to any suitable decompression techniques, e.g., YK decompression, and other known techniques, and encryption techniques, e.g., using an encryption technique such as Data Encryption Standard (DES), Triple DES, or Advanced Encryption Standard (AES). The communication subsystem 24 receives messages from and sends messages to a wireless network 100.

In the shown example of the portable electronic device 20, the communication subsystem 24 is configured in accordance with the Enhanced Data GSM Environment (EDGE) and Universal Mobile Telecommunications Service (UMTS). The portable electronic device 20 may also be operable under other standards, such as the Global System for Mobile Communication (GSM), General Packet Radio Services (GPRS), or any other standards in currently existence or that may be developed in the future. The wireless link connecting the communication subsystem 24 with the wireless network 100 represents one or more different Radio Frequency (RF) channels, operating according to defined protocols specified for the communications standard. In newer network protocols, these channels are capable of supporting both circuit switched voice communications and packet switched data communications. The different types of wireless networks that may be employed include, for example, data-centric wireless networks, voice-centric wireless networks, and dual-mode networks that may support both voice and data communications over the same physical base stations. Combined dual-mode networks include, but are not limited to, Code Division Multiple Access (CDMA) or CDMA2000 networks, GSM/GPRS networks, and third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The processor 22 also interacts with additional subsystems such as a Random Access Memory (RAM) 28, a persistent, updatable memory 30, a touch-sensitive display 33 comprising a display 32 and a touch-sensitive overlay 34, one or more actuators 37, an auxiliary input/output (I/O) subsystem 36, a data port 38, a speaker 40, a microphone 42, short-range communications 44, and other device subsystems 46. The processor 22 interacts with the touch-sensitive display 33 via a processor such as a controller 35. The actuator(s) 37 may also interact with the controller 35 and may communicate to the processor 22 through the controller 35.

Some of the subsystems of the portable electronic device 20 perform communication-related functions, whereas other subsystems may provide "resident" or on-device functions. By way of example, the touch-sensitive display 33 may be utilized for both communication-related functions, such as entering a text message for transmission over the wireless network 100, and device-resident functions such as a calculator or task list.

The portable electronic device 20 may send and receive communication signals over the wireless network 100 after network registration or activation procedures have been completed. Network access is associated with a subscriber or user of the portable electronic device 20. To identify a subscriber according to the present embodiment, the portable electronic device 20 utilizes a SIM/RUIM card 48 (i.e., Subscriber Identity Module or a Removable User Identity Module) inserted into a SIM/RUIM interface 50 for communication with a network such as the network 100. The SIM/RUIM card 48 is one type of a conventional "smart card" that may be utilized to identify a subscriber of the portable electronic device 20 and to personalize the portable electronic device 20. The portable electronic device 20 may not be fully operational for communication with the wireless network 100 without the SIM/RUIM card 48. By inserting the SIM/RUIM card 48 into the SIM/RUIM interface 50, a subscriber may access all subscribed services. Services may include: web browsing and messaging such as e-mail, voice mail, Short Message Service (SMS), and Multimedia Messaging Services (MMS). More advanced services may include: point of sale, field service and sales force automation. The SIM/RUIM card 48 may include a processor and memory for storing information. The SIM/RUIM card 48 is inserted into the SIM/RUIM interface 50, which is coupled to the processor 22. In order to identify the subscriber, the SIM/RUIM card 48 may include some user parameters such as an International Mobile Subscriber Identity (IMSI). An advantage of the SIM/RUIM card 48 is that a subscriber need not be limited to any single physical portable electronic device because the SIM/RUIM card 48 is transferable. The SIM/RUIM card 48 may store additional information for a portable electronic device as well, including datebook (or calendar) information and recent call information. Alternatively, user identification information may also be programmed into the memory 30.

The portable electronic device 20 is a battery-powered device and includes a battery interface 52 for receiving one or more batteries 54. The batteries 54 may be rechargeable and/or may be a smart battery with an embedded microprocessor. The battery interface 52 is coupled to a regulator (not shown), which assists the battery 54 in providing power V+ to the portable electronic device 20.

The portable electronic device 20 also includes an operating system 56 and software components 58 to 68 which are described in more detail below. The operating system 56 and the software components 58 to 68 that are executed by the processor 22 are typically stored in an updatable, persistent store such as the memory 30, which may be read-only memory (ROM), flash memory, and/or other storage element(s). Portions of the operating system 56 and the software components 58 to 68, such as specific device applications, or parts thereof, may be temporarily loaded into a volatile store such as the RAM 28.

The subset of example software applications 58 that control basic device operations, including data and voice communication applications, may be installed on the portable electronic device 20 during manufacture. Software applications may include a message application 60 that may be any suitable software program that provides a user with the ability to send and receive electronic messages via the portable electronic device 20. Messages that have been sent or received by the user may be stored in the memory 30 of the portable electronic device 20 or some other suitable storage element in the portable electronic device 20. Some or all of the sent and received messages may be stored remotely from the portable electronic device 20 such as in a data store of an associated host system with which the portable electronic device 20 may communicate.

The software applications may include a device state module 62, a Personal Information Manager (PIM) 64, and/or other programs or applications. The device state module 62 provides persistence, i.e., the device state module 62 ensures that important device data is stored in persistent memory, such as the memory 30, to prevent data loss when the portable electronic device 20 is turned off or loses power.

The PIM 64 includes functionality for organizing and managing data items of interest to the user, such as, but not limited to, e-mail, contacts, calendar events, voice mails, appointments, and task items. A PIM application has the ability to send and receive data items via the wireless network 100. PIM data items may be seamlessly integrated, synchronized, and updated via the wireless network 100 with the subscriber's corresponding data items stored and/or associated with a host computer system. This functionality creates a mirrored host computer on the portable electronic device 20 with respect to such items, which may be particularly advantageous when the host computer system is the portable electronic device subscriber's office computer system.

The portable electronic device 20 also includes a connect module 66, and an information technology (IT) policy module 68. The connect module 66 implements the communication protocols that are required for the portable electronic device 20 to communicate with the wireless infrastructure and any host system, such as an enterprise system, with which the portable electronic device 20 is authorized to interface.

The connect module 66 includes a set of application programming interfaces (APIs) that may be integrated with the portable electronic device 20 to facilitate any number of services associated with the enterprise system to be utilized by the portable electronic device 20. The connect module 66 establishes an end-to-end secure, authenticated communication pipe with the host system. A subset of applications for which access is provided by the connect module 66 may be utilized to pass IT policy commands from the host system to the portable electronic device 20, which may be performed in a wireless or wired manner. These instructions may be passed to the IT policy module 68 to modify the configuration of the portable electronic device 20. Alternatively, the IT policy update may also be performed over a wired connection.

Other types of software applications may also be installed on the portable electronic device 20. These software applications may be third party applications, which are added after the manufacture of the portable electronic device 20. Examples of third party applications include media players, global position system applications, games, calculators, utilities, and so forth.

The additional applications may be loaded onto the portable electronic device 20 through the wireless network 100, the auxiliary I/O subsystem 36, the data port 38, the short-range communications subsystem 44, and/or any other suitable device subsystem 46. This flexibility in application installation increases the functionality of the portable electronic device 20 and may provide enhanced on-device functions, communication-related functions, or both. For example, secure communication applications may enable electronic commerce functions and other such financial transactions to be performed using the portable electronic device 20.

The data port 38 enables a subscriber to set preferences through an external device or software application and extends the capabilities of the portable electronic device 20 by providing for information or software downloads to the portable electronic device 20 other than through a wireless communication network. The alternate download path may, for example, be utilized to load an encryption key onto the portable electronic device 20 through a direct and thus reliable and trusted connection to provide secure device communication.

The data port 38 may be any suitable port that enables data communication between the portable electronic device 20 and another computing device. The data port 38 may be a serial or a parallel port. In some instances, the data port 38 may be a USB port that includes data lines for data transfer and a supply line that may provide a charging current to charge the battery 54 of the portable electronic device 20.

The short-range communications subsystem 44 provides for communication between the portable electronic device 20 and different systems or devices, without the use of the wireless network 100. For example, the short-range communications subsystem 44 may include an infrared device and associated circuits and components for short-range communication. Examples of short-range communication standards include standards developed by the Infrared Data Association (IrDA), Bluetooth, and the 802.11 family of standards developed by IEEE.

A received signal such as a text message, an e-mail message, or web page download is processed by the communication subsystem 24 and input to the processor 22. The processor 22 processes the received signal for output to the display 32 or alternatively to the auxiliary I/O subsystem 36. A subscriber may compose data items, such as e-mail messages, utilizing the touch-sensitive display 33, and possibly the auxiliary I/O subsystem 36. The auxiliary subsystem 36 may include devices such as: a mouse, track ball, infrared fingerprint detector, or a roller wheel with dynamic button pressing capability. A composed item may be transmitted over the wireless network 100 through the communication subsystem 24.

For voice communications, the overall operation of the portable electronic device 20 is substantially similar, except that the received signals are output to the speaker 40, and signals for transmission are generated by the microphone 42. Alternative voice or audio I/O subsystems, such as a voice message recording subsystem, may also be implemented on the portable electronic device 20. Although voice or audio signal output is accomplished primarily through the speaker 40, the display 32 may also be utilized to provide additional information such as the identity of a calling party, duration of a voice call, or other voice call related information.

Figure 2:
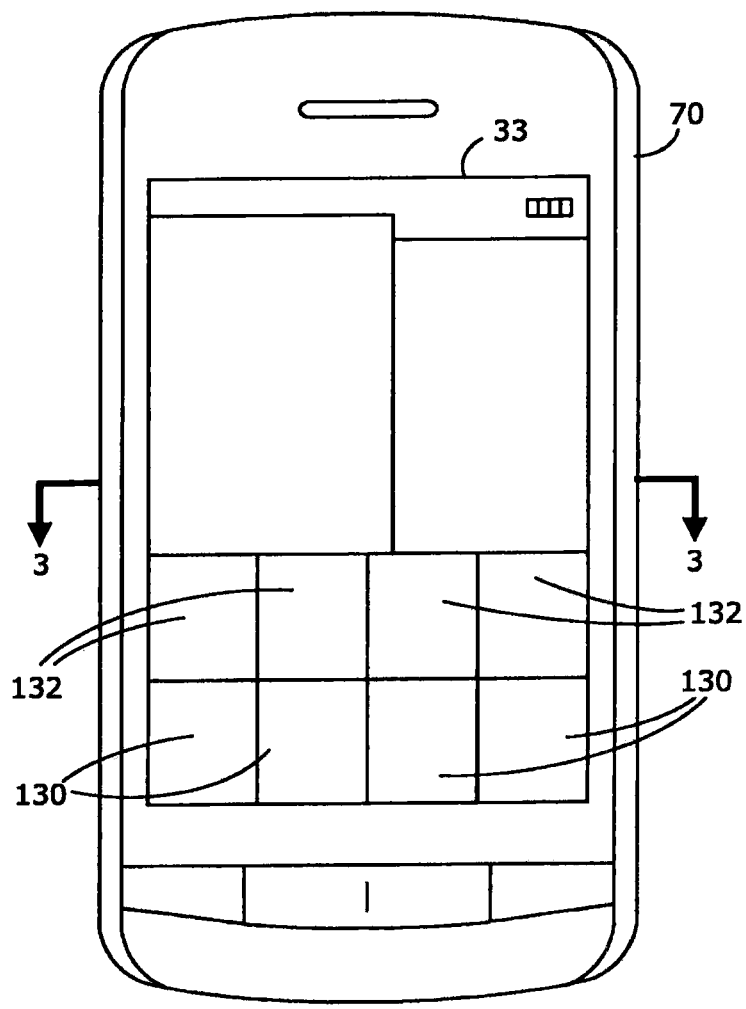
FIG. 2 is a front view of the portable electronic device in accordance with the disclosure.
Figure 3:
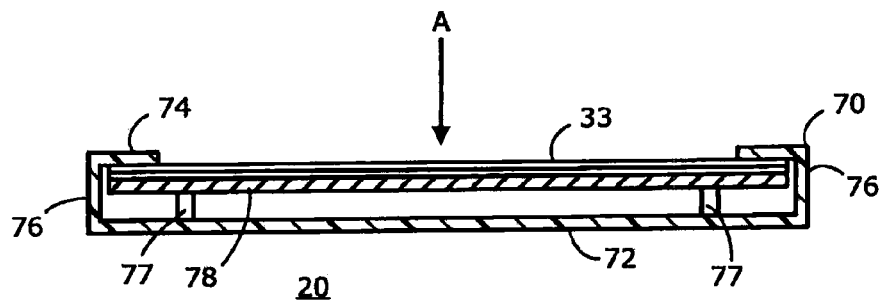
FIG. 3 is a cross-section view of the portable electronic device through line 3-3 of FIG. 2 in accordance with the disclosure.

The portable electronic device 20 comprises a housing 70 that includes a bottom 72, a frame 74, and sidewalls 76 is shown in FIG. 2 and FIG. 3. The housing 70 may include one or more pieces, for example, formed by injection molding or other processes. The touch-sensitive display 33 is shown disposed within the housing 70 near the frame 74. The touch-sensitive display 33 may be movable with respect to the housing 70. The frame 74 is sized and shaped to provide an opening through which the touch-sensitive display 33 is accessible to contact. The touch-sensitive display 33 may be supported by a support 78 such as a tray. Although not shown, various other components may be disposed in the housing 70, such as those described and shown in FIG. 1.

Figure 4:
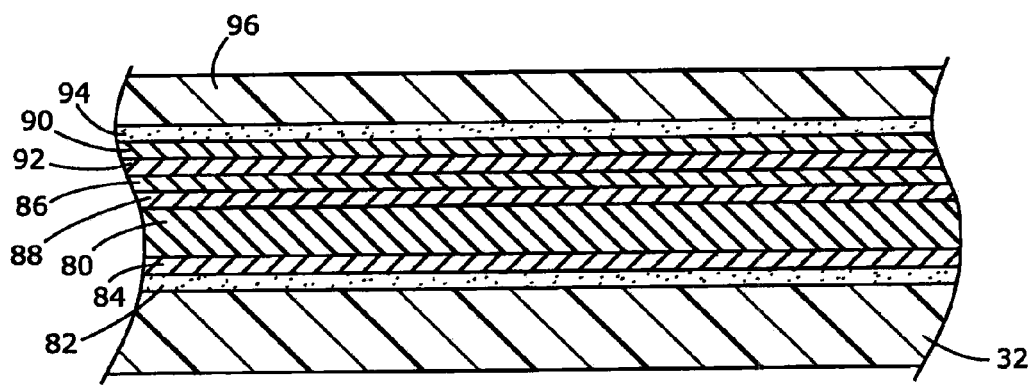
FIG. 4 is a sectional view of a touch-sensitive display in accordance with the disclosure.

A sectional view of a touch-sensitive display 33 is shown in FIG. 4. The touch-sensitive display 33 comprises layers in conjunction with the display 32 and may be attached, for example by an adhesive 82, such as an Optically Clear Laminating Adhesive available from 3M Company. Although layers are shown in the drawings, the elements disposed among these layers may be implemented in structures other than layers.

A ground shield layer 84 may be attached to the display 32 via an adhesive 82 that is advantageously translucent or transparent. The ground shield layer 84 may be connected to a ground or voltage supply and may shield the other layers of the touch-sensitive display 33 from the display 32. The ground shield layer 84 may comprise, for example, indium tin oxide (ITO), antimony tin oxide (ATO), or aluminum-doped zinc oxide (ZAO) applied to a substrate 80, for example, by sputter coating onto the substrate 80. The substrate 80 may be a translucent or transparent glass plate or other suitable material, for example, polycarbonate, plastic, glass, polymethylmethacrylate (PMMA), other dielectric materials, and so forth. Other layers shown include a touch sensor layer 88 comprising one touch sensor, a dielectric layer 86, another touch sensor layer 92 comprising another touch sensor, an insulating layer 90, and a cover 96.

The dielectric layer 86 and the insulating layer 90 are comprised of suitable non-conductive material such as silicon dioxide, silicon nitride, or other suitable material for electrically isolating the touch sensor layers 88, 92. The dielectric layer 86 and the insulating layer 90 may be translucent or transparent coatings of suitable thickness, for example, deposited by physical vapor deposition, to provide a dielectric layer, that may be, for example, between 100 nm and 300 nm thick.

The cover 96 protects the touch-sensitive display from dust and other contaminants. The cover 96 is translucent, and may be comprised, for example, of polymer, plastic, glass, and so forth, or may be a spray coating, rather than a pre-formed part. The cover 96 advantageously has sufficient flexibility or other characteristics to transfer an applied pressure or force to the layers below, such as the touch sensor layers 88, 92. The cover 96 may be attached to the insulating layer 90 by an adhesive 94 that is advantageously translucent or transparent.

One or more touches, also known as touch contacts or touch events, may be detected by the touch-sensitive display 33. The processor 22 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-sensitive display 33. For example, the x location component may be determined by a signal generated from one touch sensor, for example, the touch sensor layers 88, and the y location component may be determined by a signal generated from another touch sensor, for example, the other touch sensor layer 92. A signal is provided to the controller 35 in response to detection of a touch. A touch may be detected from any suitable object, such as a finger, thumb, appendage, or other items, for example, a stylus, pen, or other pointer, depending on the nature of the touch-sensitive display 33. Multiple simultaneous touches may be detected.

Figure 5:
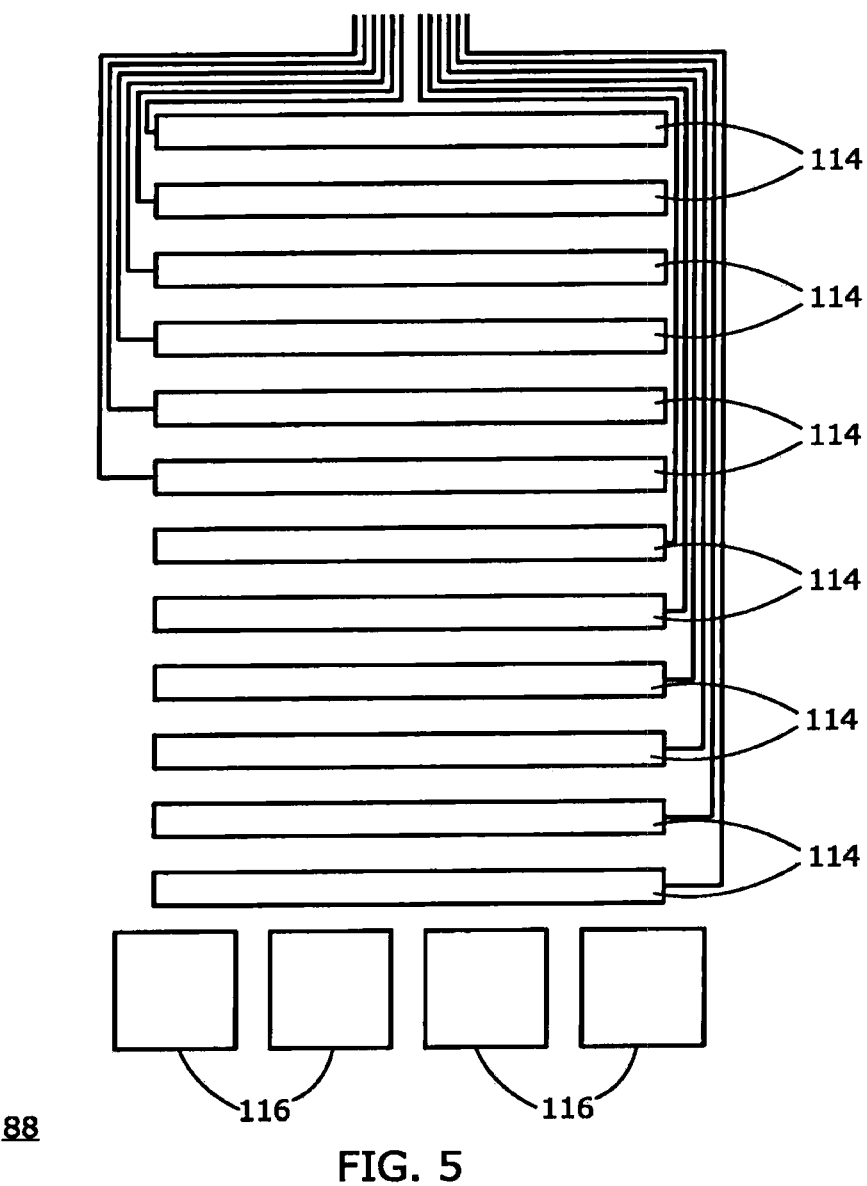
FIG. 5 illustrates a touch sensor layer of a touch-sensitive display in accordance with the disclosure.

An example of a touch sensor layer 88 is shown in FIG. 5. In this example pattern, the touch sensor layer 88 comprises a capacitive touch sensor that includes a plurality of horizontal members 114 that facilitates determination of the x component of a touch location. The touch sensor layer 88 optionally includes four discrete touch-sensitive areas 116 that receive input from corresponding displayed virtual buttons 130, such as shown in FIG. 2. Each horizontal member 114 and each of the discrete areas 116 are advantageously connected to the controller 35 by separate electrical conductors.

Figure 6:
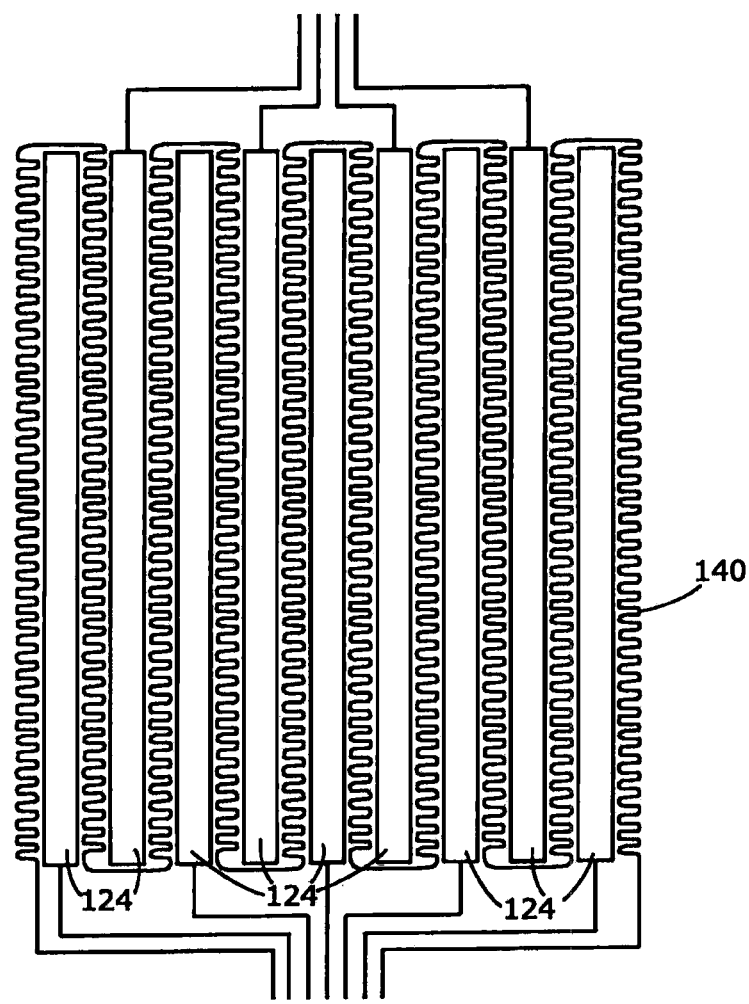
FIG. 6 illustrates a touch sensor layer with a force sensor in accordance with the disclosure.

An example of a touch sensor layer 92 with a force sensor is shown in FIG. 6. As shown, the touch sensor layer 92 comprises a capacitive touch sensor that includes a plurality of vertical members 124 that facilitates determination of the y component of a touch location. The vertical members 124 as shown extend generally perpendicularly to the horizontal members 114 of the other touch sensor layer 88. Each vertical member 124 is advantageously connected to the controller 35 by separate electrical conductors.

The horizontal members 114 and vertical members 124 are advantageously sized and arranged to provide x and y touch location components for the display area of the touch-sensitive display 33. The x and y location components of a touch may be determined by a signal generated from each touch sensor 88, 92, for example, as a result of capacitive coupling. Similarly, a touch may be associated with one of the areas 116 by detecting a touch corresponding to one of the virtual buttons 130, such as are shown in FIG. 2.

The touch sensor layer 88 may comprise ITO distributed in a pattern on one dielectric layer 86. The other touch sensor layer 92 may comprise ITO distributed in a pattern on the other dielectric layer 90. The touch sensor layers 88, 92 may alternatively be comprised of other materials such as ATO and ZAO. The touch sensor layers 88, 92 may be patterned by masking followed by etching of the unmasked areas to provide a thin layer, for example, between 10 nm and 30 nm. Although the examples above associate the x location component with one touch sensor layer 88 and the y location component with another touch sensor layer 92, the x and y component values are arbitrarily assigned independent of the axes of the touch-sensitive display, and need not be assigned as described above.

The touch sensor layer 92 may also include at least one force sensor 140. The force sensor(s) may be force sensitive resistors, strain gauges, strain sensors, piezoelectric or piezoresistive devices, pressure sensors, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. In the example of FIG. 6, the force sensor comprises a continuous, serpentine pattern disposed in the gaps between the vertical touch sensor members 124. The force sensor 140 is electrically isolated from the touch sensor members 124. Conductors electrically connect the force sensor 140 to the controller 35 or the processor 22. The force sensor 140 may be formed in the same manner, of the same material, and/or at the same time as the touch sensor members 124. Alternatively, the force sensor 140 may be disposed within the other touch sensor layer 88. Integrating the force sensor 140 in a touch sensor layer 88, 92 is an inexpensive way to implement a force sensor because the force sensor 140 may be formed of the same material during the same process without requiring separate discrete components that take up space outside the touch-sensitive display 33. The same controller 35 or processor 22 may also be utilized to process the force sensor 140 and touch sensor 88, 92 signals.

The touch sensors layers 88, 92 advantageously comprise a material that is optically translucent or transparent, for example a thin film, such that light emitted from the display 32 is visible on the outside of the touch-sensitive display 33. The touch sensor layers 88, 92 may advantageously comprise, for example, piezoelectric or piezoresistive materials, such as ITO, ATO, ZAO, and so forth, which are advantageously optically translucent or transparent. Piezoresistive material at room temperature exhibits low sheet or layer resistivity, for example, in the range of 50 to 300 ohms/square, and relatively high (negative) gage factor, on the order of 5 to 10 gage factor or higher. ITO is a piezoresistive material with a gauge factor greater than known metal strain gauges. Although the material comprising the capacitive touch sensor and the force sensor may differ, for example, to optimize the capacitive and resistive properties, utilizing the same material for both sensors is beneficial because the second touch sensor layer 92, including the force sensor 140, may be formed during the same process.

A touch imparted on the touch-sensitive display 33 causes the force sensor 140, for example, to undergo an electrical change in resistance that corresponds to a force imparted by the touch. The change in resistance may occur due to a change in geometry of the deflected or displaced material and the change in resistivity of the material arising from microchanges in the structure of the material under pressure. Generally, between about 1 and 5 N of force may be applied by a user to the touch-sensitive display 33, for example, in the general direction of arrow A shown in FIG. 3. Under such force conditions, the total change in resistance may be, for example, on the order of about 0.01%.

Figure 7:
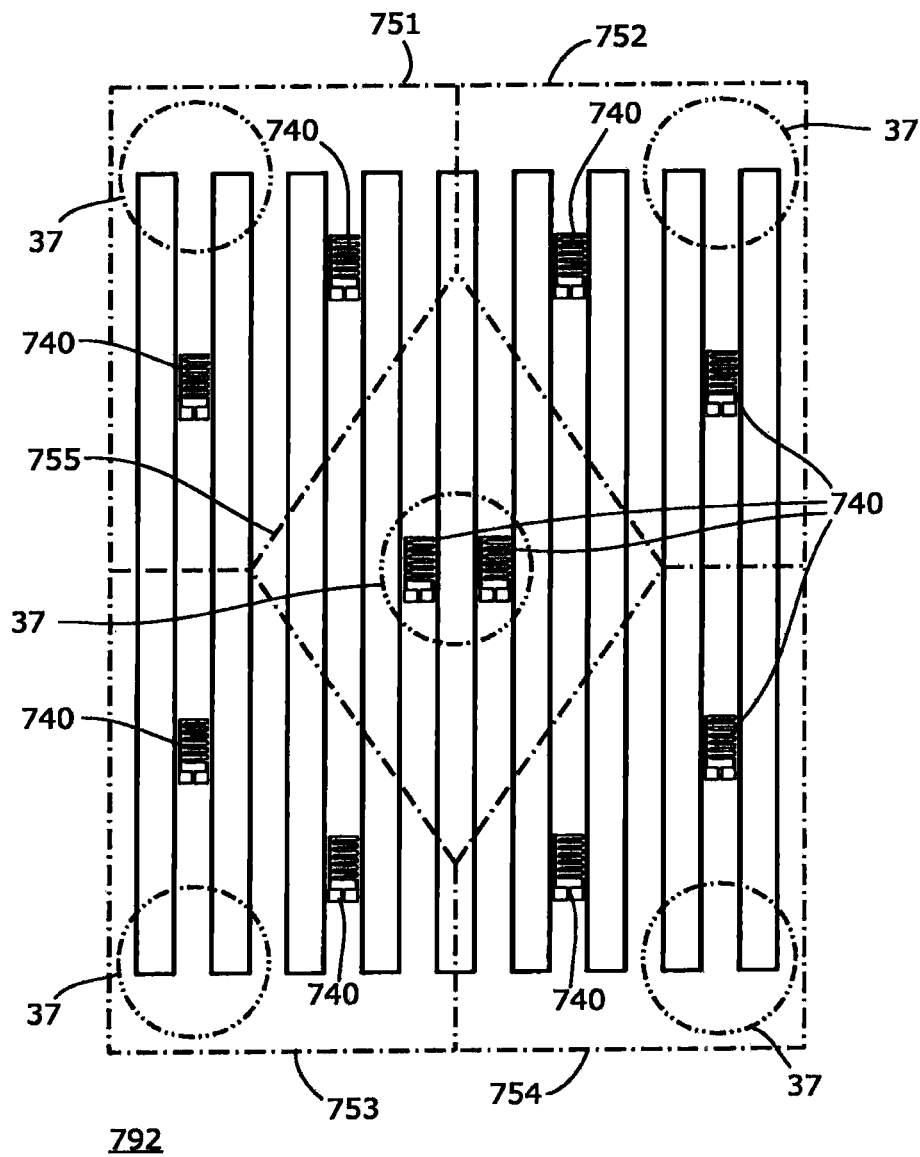
FIG. 7 illustrates a touch sensor layer with multiple discrete force sensors in accordance with the disclosure.

The example pattern of the force sensor 140 shown in FIG. 6 occupies enough of the available area of the touch sensor layer 92 that force may be sensed for any location of a touch on the touch-sensitive display 33. Various other patterns of the force sensor may be utilized, such as patterns of a single, continuous sensor or patterns of multiple discrete sensors electrically coupled to one another or in isolation, such as shown in FIG. 7. Any suitable single force sensor pattern may be advantageously utilized because the force or the majority of the force of a touch is generally perpendicular to the plane of the cover 96 of the touch-sensitive display 33, i.e., in the z direction. Other patterns, such as multiple force sensor patterns, e.g., bi-directional, multi-grid patterns, may provide increased sensing accuracy with less dependency on the width and orientation of the pattern or the direction of the touch. For example, planar or stacked rosette patterns, such as "tee", "delta," and "rectangular" rosettes, may be utilized.

Another example of a touch sensor layer 792 that facilitates determination of the y component of a touch location is illustrated in FIG. 7. In this example, the touch-sensitive display 33 is divided into five zones 751, 752, 753, 754, 755, with their area boundaries indicated by dashed lines in FIG. 7. Ten discrete force sensors 740 are shown with two force sensors 740 located in each of the five zones 751, 752, 753, 754, 755. Each zone 751, 752, 753, 754, 755 may include an actuator 37, as indicated by dashed circles in FIG. 7.

The force sensors 740 are shown in FIG. 7 in a rosette pattern, although any other suitable pattern may be utilized, including, for example, single force sensor patterns, multiple force sensor patterns, multi-directional patterns, stacked or planar configurations, patterns of other shapes, and so forth. The individual force sensors 740 may be electrically coupled to one another and to the controller 35 or the processor 22, such that a change in resistance or force sensed at any one of the force sensors 740 may generate a signal to the electronic controller 35 or the processor 22 without differentiating which force sensor 740 sensed the force. The force sensors 740 are electrically isolated as shown in FIG. 7, and separate conductors connect each individual force sensor to the controller 35 or the processor 22.

The values from one or more individual force sensors 740 may be utilized, independently or by averaging, to actuate one or more associated actuators 37. Tactile feedback may be provided corresponding to the specific zone or zones in which a touch is detected. Such tactile feedback may give the user greater accuracy and sense of control over input to the portable electronic device.

The force sensor(s) may additionally or optionally be located below the display, such as illustrated in FIG. 3. The force sensors 77 shown in FIG. 3, which may comprise one or more posts that may deflect as the touch-sensitive display 33 moves in response to a touch. Deflection of the force sensors 77 generates a force signal that is sent to the controller 35 and/or the processor 22. The posts 77 may be composed of a piezoelectric material through which an electrical change in resistance may be detected to provide a force signal/force value corresponding to the force imparted on the touch-sensitive display.

The force sensor 140 sends a force signal to the controller 35 or the processor 22, for example, in response to a change in resistance resulting from the application of force exerted on the touch-sensitive display 33, for example, by a touch. The change in resistance results from the application of force, rather than due to an electrical coupling as with the capacitive touch sensor, such that touch by a non-conductive object may be detected by the force sensor 140. The processor 22 determines whether the force signal corresponds to a touch and may perform a function associated with the detected touch location.

The portable electronic device 20 may be configured to perform functions when the force sensor 140 indicates that a touch of sufficient force has been imparted on the touch-sensitive display 33. For example, a backlight (not shown) may be activated or a "home" screen may be displayed on the touch-sensitive display 33. The portable electronic device 20 may determine whether a touch constitutes a command to perform a function. A "click" event is a touch that corresponds to a virtual button depressed with a sufficient force, e.g., a touch having a force exceeding a force threshold or any other input action that warrants feedback. Feedback may include tactile feedback, e.g., vibration, impulse, deflection, or other movement of the touch-sensitive display 33, visual feedback, e.g., a flashing light, displaying a visual indicator such as a symbol on the touch-sensitive display 33, and so forth, and/or audible feedback, e.g., emitting a beep, playing an audible media file, and so forth. One or more additional factors of the touch may also be utilized to process a touch, such as the time duration of the touch and the location of the touch.

Figure 8:
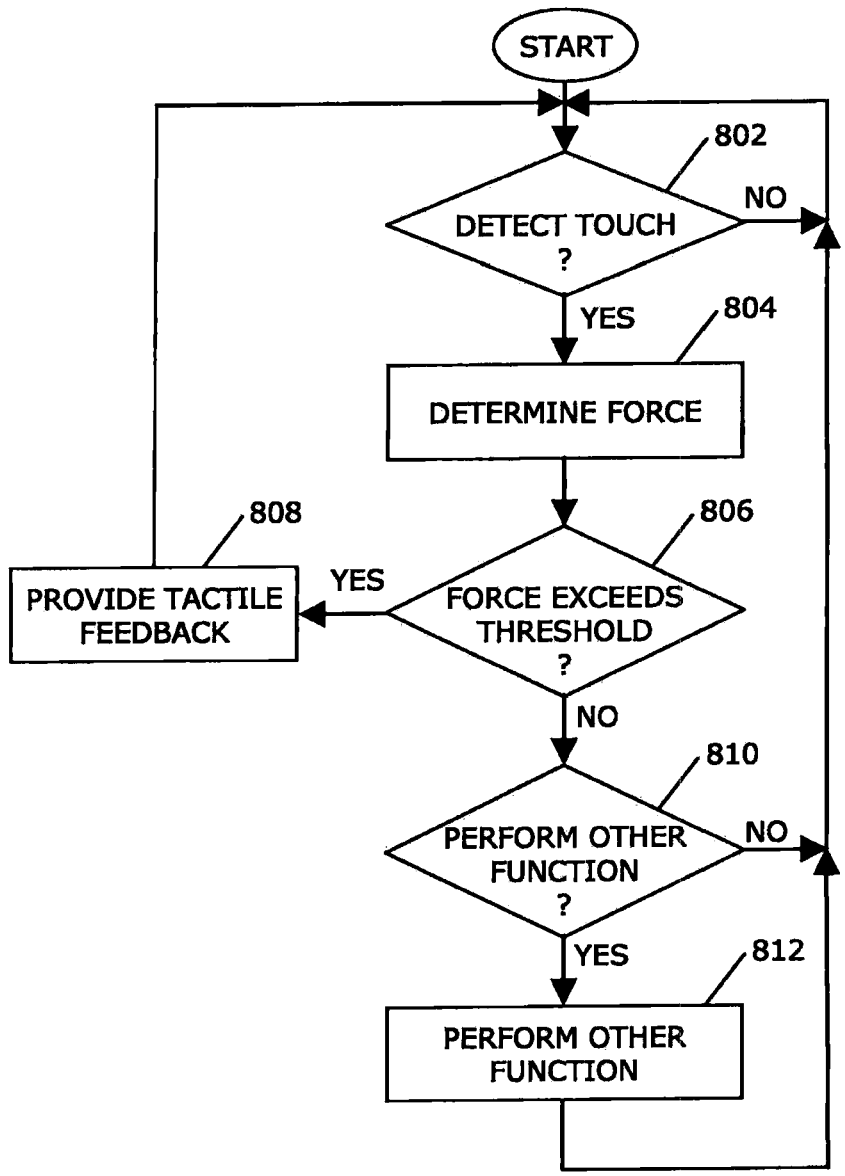
FIG. 8 is a flowchart showing a method of responding to a touch in accordance with the disclosure.

A method of determining whether to provide tactile feedback in response to a touch is illustrated in FIG. 8. The method may be carried out by software executed, for example, by the processor 22 and/or the controller 35. Coding of software for carrying out such a method is within the scope of a person of ordinary skill in the art given the present description. Fewer or additional processes may be performed than those shown and described with respect to the flowchart. When a touch is detected 802, the force of the touch is determined 804.

When the force of the touch exceeds a threshold value 806, tactile feedback is provided 808. This determination may be performed in numerous ways, for example, by correlating the resistance changes in the force sensor 140, e.g., the sensed force, to force values and comparing the correlated value to a threshold force value. Forces in the range of 1 to 5 N, for example, may be utilized as such a threshold force value. When the force of the touch exceeds the force threshold 806, one or more actuators 37 may be actuated by sending a feedback signal to the actuators 37 to provide tactile feedback 808, such as described above. In addition to providing tactile feedback, when the force of the touch exceeds a force threshold 806, a function may be performed 808 that is associated with the location of the touch. A touch that imparts a force that exceeds the threshold 806 may be referred to as a "click" event. Optionally, tactile feedback may not be provided when the location of the touch does not correspond to a virtual button or other selectable feature, even though the force threshold is exceeded.

The actuators 37 may be any type of motion inducing device, such as a piezoelectric device or hydraulic actuator operably coupled to the touch-sensitive display 33. Multiple actuators 37 may be utilized, which may be, for example, discrete, acoustic, and/or impulse components, piezoelectric sound emitter, buzzer, diaphragm type components, audible emitter, disc-shaped piezoelectric diaphragms of internal or external drive types, such as the 7BB series of components commercially available from Murata Manufacturing Co., Ltd. of Kyoto, Japan. The actuators 37 may be coupled to the touch-sensitive display 33, for example, by direct or indirect coupling. The amplitude and duration of the feedback provided by the actuators 37 may vary, for example, according to the force or the function assigned to a virtual button or other selectable feature associated with the location where the touch is detected.

When the touch does not exceed a force threshold at 806, a subsequent determination is made 810 whether to perform another function, without providing tactile feedback, such as highlighted as displayed feature such as a virtual button associated with the location of the touch. Tactile feedback or other feedback, such as visual or audible, may optionally be provided, and may be different than the feedback provided at 808. A comparison of the determined force to one or more threshold values may be utilized at 810. By way of example, a force that is less than that a force corresponding to a "click" event for which tactile feedback is provided, but which force meets a lesser threshold force value, may indicate a touch corresponding to a different type of touch function or response, such as a scroll, highlight, text select, drag and drop, pop-up menu, and so forth, which function is performed 812. The location of the touch on the touch-sensitive display 33 may be taken into account in the determination 810 of whether and which function is performed. A force below the force threshold may result in the provision of a visual indicator, for example, associated with a location of the force, such as highlighted of a feature associated with the touch location.

Optionally, a temporal aspect of the touch may be utilized to determine whether to provide a response. The signal from the force sensor 140 may be monitored for continuity to determine the length of time that a single touch is applied to the touch-sensitive display 33. This time period may be processed in combination with the threshold force values. For example, when a touch is received that meets the threshold force value, but is of duration longer than a predetermined length of time, tactile feedback may not be provided and no function may be performed. This long touch may be result in an optional function corresponding to the force and/or location of the touch on the touch-sensitive display 33. Similarly, optional functions may be performed for shorter durations of touches.

In another example, two rows of four virtual buttons 130 and 132 may be displayed, such shown in FIG. 2. The lower row of virtual buttons 130 is displayed on the touch-sensitive display 33 at areas corresponding to the four discrete areas 116 of the touch sensor layer 88, as described above. A touch detected at any of the virtual buttons 130 causes a signal to be sent through the associated area 116. When the touch exceeds a force threshold, the actuator(s) 37 may provide tactile feedback, as described above. A location of the touch may be associated with any of the virtual buttons 132 to determine whether an associated function may be performed. When the force of the touch at any of these virtual buttons 132 exceeds a threshold value, e.g., a "click" event, tactile feedback may be provided. For example, when a touch location correspond to a "Contacts" virtual button, the processor 22 determines that such a command is selected based on the x and y components of the location received from the electronic controller 35 and performs the associated function, for example, by opening the Contacts application and providing tactile feedback due to detection of a "click" event.

While the embodiments described herein illustrate particular implementations of the portable electronic device, other modifications and variations to these embodiments are within the scope of the present disclosure. For example, the size and shape of many of the features, including the patterns of the touch sensors and the force sensors, may vary while still providing the same functions. The touch sensors are not limited to rectangular shapes as shown in the drawings, and may be any suitable shape such as triangles, diamonds, and so forth. With triangularly shaped pads, the location of a touch along the taper may be determined as the resulting capacitance differs based on the width of the respective one of the pads at the touch location, such that only a single capacitive touch sensor layer and dielectric layer may be needed. The touch sensors and force sensors may be located within other layers than described herein, and may be disposed in separate layers. Resistive, optical, or other technology touch-sensitive displays may be utilized to provide alternatives to identify the location of a touch. Many other modifications and variations may occur to those skilled in the art. All such modifications and variations are believed to be within the scope of the present application.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. An electronic device comprising:
    a touch-sensitive display including a layer, the layer comprising:
    a touch sensor disposed on a substrate; and
    a force sensor disposed on the substrate and configured to generate a force signal based at least in part on a force applied to the touch-sensitive display; and
    a processor configured to receive the force signal and provide a feedback signal when the force exceeds a force threshold,
    wherein the touch sensor comprises a plurality of touch sensor members and the force sensor is disposed in gaps between the touch sensor members.

2. The electronic device of claim 1, further comprising an actuator configured to provide tactile feedback in response to receiving the feedback signal.

3. The electronic device of claim 2, wherein the actuator is actuated to move the touch-sensitive display relative to a housing of the portable electronic device when the feedback signal is received.

4. The electronic device of claim 1, wherein the processor provides the feedback signal when a location of the touch on the touch-sensitive display is associated with a selectable feature displayed on the touch-sensitive display and the force signal exceeds the force threshold.

5. The electronic device of claim 1, wherein the processor is configured to determine a time duration of the touch and wherein the feedback signal is provided when the time duration is less than a specific length of time.

6. The electronic device of claim 1, wherein the touch-sensitive display is configured to provide a visual indicator associated with a location of the force when the force is below the force threshold.

7. The electronic device of claim 1, wherein the force sensor is distributed in a pattern within the layer of the touch-sensitive display.

8. The electronic device of claim 1, wherein the layer comprises a plurality of discrete force sensors disposed in the layer.

9. The electronic device of claim 1, wherein the force sensor comprises a continuous serpentine pattern.

10. The electronic device of claim 1, wherein the electronic device is configured to perform a function associated with a location of a touch on the touch-sensitive display when the force of the touch exceeds the force threshold.

11. A method comprising:
  detecting via a touch sensor a touch at a location on a touch-sensitive display, the touch sensitive display having a layer comprising the touch sensor disposed on a substrate and a force sensor disposed on the substrate, by utilizing the touch sensor, wherein the touch sensor comprises a plurality of touch sensor members and the force sensor is disposed in gaps between the touch sensor members;
  determining a force of the touch in response to a signal from the force sensor; and
  providing feedback to the touch-sensitive display when the force of the touch exceeds a force threshold.

12. The method of claim 11, comprising providing a visual indicator associated with the location when the force is below the force threshold.

13. The method of claim 11, further comprising determining the force of the touch and the location of the touch and sending a feedback signal to an actuator to provide the tactile feedback utilizing the touch-sensitive display.

14. The method of claim 11, wherein feedback is not provided when
  the force is below the force threshold.

15. The method of claim 11, further comprising determining a time duration of the touch and providing the tactile feedback when the time duration is less than a specific length of time.

16. The method of claim 11, further comprising performing a function associated with the location when the force of the touch exceeds the force threshold.

17. A non-transitory computer readable medium having computer-readable code, which when executed by at least one processor of an electronic device, causes the electronic device to:
  detect via a touch sensor a touch at a location on a touch-sensitive display, the touch sensitive display having a layer comprising the touch sensor disposed on a substrate and a force sensor disposed on the substrate, by utilizing the touch sensor, wherein the touch sensor comprises a plurality of touch sensor members and the force sensor is disposed in gaps between the touch sensor members;
  determine a force of the touch in response to a signal from the force sensor; and
  provide feedback to the touch-sensitive display when the force of the touch exceeds a force threshold.

18. A touch-sensitive display comprising:
  a display; and
  a layer disposed on the touch-sensitive display, the layer comprising a touch sensor disposed on a substrate to detect a touch and determine a location of the touch on the touch-sensitive display, and a force sensor disposed on the substrate to generate a force feedback signal based on a force applied to the touch-sensitive display when the touch is detected,
  wherein the touch sensor comprises a plurality of touch sensor members and the force sensor is disposed in gaps between the touch sensor members.

19. The touch-sensitive display of claim 18, wherein the touch sensor comprises a capacitive touch sensor.

20. The touch-sensitive display of claim 18, wherein the touch sensor and the force sensor are formed during the same process.

21. The touch-sensitive display of claim 18, wherein the touch sensor and the force sensor are formed of the same material.

22. The touch-sensitive display of claim 18, wherein the force sensor comprises a continuous serpentine pattern.

23. The touch-sensitive display of claim 18, wherein a function associated with a location of a touch on the touch-sensitive display is performed when the force of the touch exceeds the force threshold.

* * * * *